United States Patent [19]

Hartig

[11] 3,941,546

[45] Mar. 2, 1976

[54] APPARATUS AND PROCESS

[75] Inventor: Martval John Hartig, Wilmington, Del.

[73] Assignee: E. I. Du Pont de Nemours and Company, Wilmington, Del.

[22] Filed: Mar. 14, 1974

[21] Appl. No.: 451,119

[52] U.S. Cl.............. 425/387 R; 425/392; 264/94; 249/173
[51] Int. Cl.².................... B29D 23/01; B29D 23/03
[58] Field of Search........... 425/387 R, 387 B, 392, 425/72, 326 R; 249/65, 173; 264/94, 95

[56] References Cited
UNITED STATES PATENTS

| 1,762,440 | 6/1930 | Howe................................ 249/173 |
| 3,257,689 | 6/1966 | Weyer................................ 425/387 |
| 3,296,344 | 1/1967 | Timmerman........................ 264/95 |
| 3,454,257 | 7/1969 | Dupuis............................... 249/173 |
| 3,600,488 | 8/1971 | Yazawa.............................. 425/72 X |
| 3,611,516 | 10/1971 | O'Conner et al................... 249/173 |
| 3,647,340 | 3/1972 | Sakurai et al...................... 425/326 |
| 3,679,167 | 7/1972 | Jupiter et al....................... 249/173 |
| 3,752,630 | 8/1973 | Takagi et al....................... 425/392 X |
| 3,836,111 | 9/1974 | Binder............................... 249/173 X |

FOREIGN PATENTS OR APPLICATIONS

| 39-4330 | 1964 | Japan................................. 264/94 |
| 38-16245 | 1963 | Japan................................. 264/94 |

*Primary Examiner*—Francis S. Husar
*Assistant Examiner*—Carl Rowold

[57] ABSTRACT

In the apparatus for preparing heat-shrinkable plastic tubing by radially expanding lengths of plastic tubing to a larger diameter within a rigid cylinder by heating the cylinder externally and pressurizing the interior of the extruded plastic tubing with gas to cause the tubing to radially expand against the interior walls of the rigid cylinder, the improvements which comprise:

a. employing in place of the rigid cylinder a heat-resistant flexible sheet looped into a cylindrical shape to form a restraint, b. employing a pair of clamps extending longitudinally along the cylindrical shaped sheet along the portions of the sheet which meet and abut to form the cylinder, positioned such that the ends of said sheet are between the clamps, and c. employing means for heating the tubing comprising a device for injecting a hot gas into the interior of the extruded plastic tubing.

3 Claims, 3 Drawing Figures

APPARATUS AND PROCESS

FIELD OF THE INVENTION

This invention relates to the manufacture of heat-shrinkable, plastic tubing. More particularly, the invention is directed to apparatus and processes for making the tubing by expanding it within the confines of a flexible, tubular-like restraint whose diameter can be easily adjusted.

BACKGROUND OF THE INVENTION

Heat-shrinkable, plastic tubing has many uses. Polyolefin heat-shrinkable tubing is used in packaging food. Tetrafluoroethylene polymer heat-shrinkable tubing, because of its chemical resistance and electrical properties, is placed around elastomeric rolls used in printing presses and copying machines and is also used for putting a snugly fitting coating on electrical connections. Generally in these applications, the tubing is placed around the article to be covered and then heat shrunk to form a tight fit around the article.

In the art, heat-shrinkable plastic tubing can be made by radially expanding lengths of plastic tubing to a larger diameter within a rigid cylinder such as a metal or glass pipe, heating the pipe externally and pressurizing the interior of the plastic tubing to cause it to radially expand against the interior walls of the pipe, cooling, and then releasing the pressure. The plastic tubing so prepared retains sufficient orientation to produce a substantial, e.g., 30%, radial shrinkage when it is placed around an article and heated, which causes it to shrink tightly around the article.

The foregoing art procedure has several disadvantages:

Firstly, the rigid pipe permits only one size diameter plastic tubing to be made. If different size plastic tubing is wanted, another size pipe must be fabricated and used to replace the pipe already fixed in the apparatus. In the invention described herein, this disadvantage is obviated by employing a heat-resistant tubular-like or cylindrical, flexible restraint in place of the pipe whose diameter can be rapidly and easily adjusted. Thus, a single apparatus can be used to make a variety of diameters of the plastic tubing.

Secondly, heating the rigid pipe in order to heat the plastic tubing is time consuming. Moreover, initially the tubing is in contact with pipe only at the bottom where it rests against the pipe and this causes non-uniform heating of all the portions of the tubing and the blowing out of hot spots. These disadvantages are overcome by heating the tubing while it is being pressurized by forcing a hot gas into the interior of the tubing.

SUMMARY OF THE INVENTION

The apparatus of this invention is defined as follows:

In the apparatus for preparing heat-shrinkable plastic tubing by radially expanding lengths of plastic tubing to a larger diameter within a rigid cylinder by heating the cylinder externally and pressurizing the interior of the extruded plastic tubing with gas to cause the tubing to radially expand against the interior walls of the rigid cylinder, the improvements which comprise:

a. employing in place of the rigid cylinder a heat-resistant flexible sheet looped into a cylindrical shape to form a restraint, b. employing a pair of clamps extending longitudinally along the cylindrical shaped sheet along the portions of the sheet which meet and abut to form the cylinder, positioned such that the ends of said sheet are between the clamps, and c. employing means for heating the tubing comprising a device for injecting a hot gas into the interior of the extruded plastic tubing.

The process of this invention is defined as follows:

In the process for making heat-shrinkable plastic tubing by positioning a plastic tube longitudinally within a cylindrical restraint of larger diameter than the expandable tube, applying heat to the restraint and pressurizing the interior of the plastic tube to cause the tube to expand radially to a diameter determined by the diameter of the cylindrical restraint, cooling the materials and removing the plastic tubing, the improvements which comprise, employing as the cylindrical restraint a heat-resistant, flexible sheet looped into cylindrical form and held by clamps extending longitudinally along the cylinder at the point where the sheet meets and abuts to form the cylinder, adjusting the sheet to provide a desired diameter loop, and applying heat by admitting a hot gas into the interior of the extruded plastic tubing.

DESCRIPTION OF THE INVENTION

Figure 1:
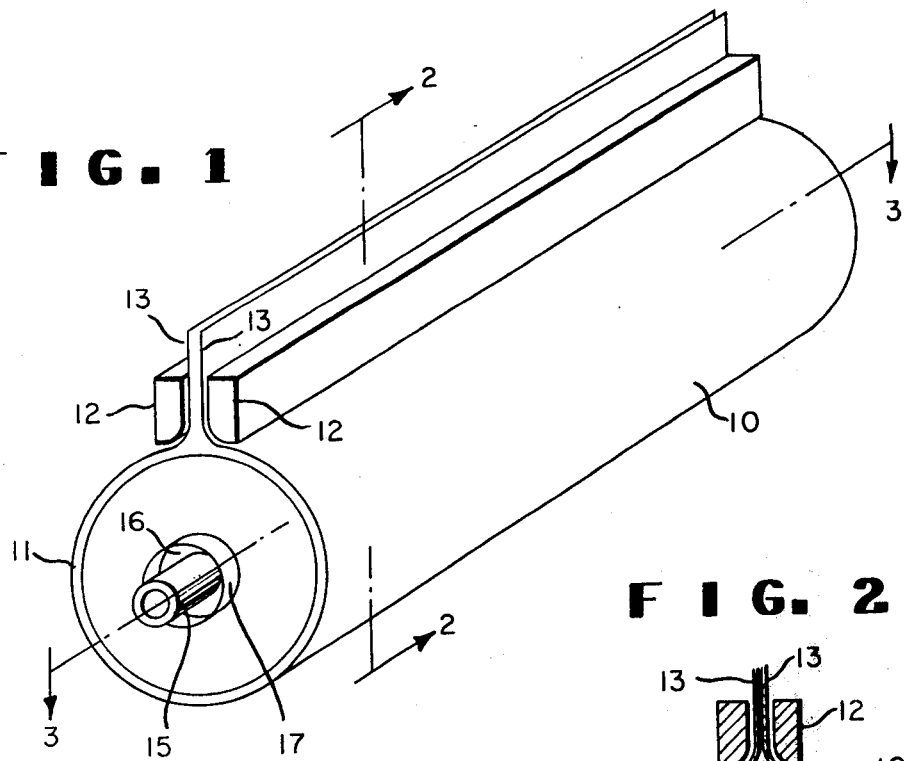
FIG. 1 is a perspective view showing the cylindrical restraint 10, an end pressure-tight fitting 11 with gas entry or exit tube 15, plug 16, longitudinally-extending clamps 12, and plastic tubing 17.
Figure 2:
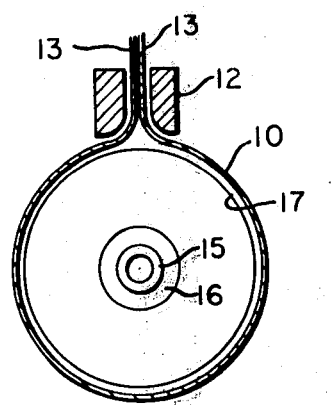
FIG. 2 is a view of the cylindrical restraint taken along line 2—2 of FIG. 1 and shows how the flexible restraint sheet is formed into cylindrical restraint 10 by looping it into tubular shape and clamping the ends 13 together with clamps 12. By adjusting the height of one of the ends 13, it is seen that the diameter of the cylindrical restraint can easily be made larger or smaller. Pipe 15 comprises a gas entry or exit means depending on the end being viewed.
Figure 3:
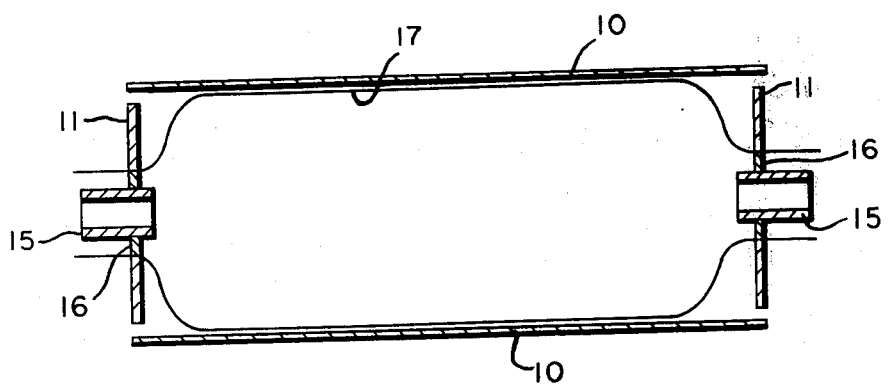
FIG. 3 is a view taken along line 3—3 of FIG. 1 and showing the plastic tubing 17 within the cylindrical restraint 10 after expansion, and a view of the end plugs 16, gas tube 15 and fitting 11.

In practice, the assembly of the unexpanded plastic tubing within the cylindrical flexible restraint sheet is heated to a suitable temperature by applying a hot gas, preferably steam, to the interior of the plastic tubing. Pressure is applied and the pressure of the gas forces the plastic tube against the cylindrical restraining sheet, and after only a few seconds, the expanded plastic tube is cooled in place, preferably by air. It is then removed and cleaned or dried, if desired. The partially expanded ends of the plastic tube are trimmed off, leaving the tubing in a heat-shrinkable form ready for use.

The flexible restraint sheet employed should be sufficiently flexible to be formed into a cylinder and be clamped and unclamped repeatedly. Flexibility is partially achieved by virtue of thinness of the sheet. On the other hand, the flexible sheet should have a reasonably high tensile modulus so that the pressure exerted on it by the expanding plastic tube will not excessively stretch the flexible sheet. The sheet should be heat-resistant, i.e., it should not itself expand radially to any appreciable extent upon being pressured at the temperatures used to heat the plastic tubing. The flexible sheet can produce the same size heat-shrinkable tubing on each repetitive run with the longitudinal clamps in the same position. To accomplish this, the amount of reproducable and recoverable strain of the flexible sheet should be less than 5%, and preferably less than 2%. In addition, the flexible sheet should resist deterioration at the temperatures to which it is exposed while carrying out the process. This temperature will vary depending upon the plastic tubing employed.

Suitable flexible sheet for use, especially with tetrafluoroethylene polymer, includes: polyimide film made of an oriented aromatic polyimide (e.g., Kapton); glass cloth; nylon paper made of oriented aromatic polyamide fibrids (e.g., Nomex); glass cloth coated with silicone rubber; glass cloth coated with a fluorocarbon resin; and combinations of these such as Kapton polyimide film backed up with glass cloth. Cloth may be woven, non-woven or knitted and the like. A preferred flexible sheet is glass fabric coated with a heat-resistant elastomer that is preferably non-tacky. The elastomer coating should be thick enough so the heat-shrinkable tubing has a smooth, pattern-free finish. The weight or strength of the glass fabric needed will depend on the size of the tubing to be made. The fabric should be mounted in such a direction that maximum strength and modulus are available in the hoop direction.

The process of this invention is preferably applied to make heat-shrinkable tubing of 1–20 inches diameter, but is not necessarily limited to those diameters, and is basically suitable up to a diameter of 8 feet. The length is preferably 1–24 feet; but length is not necessarily limited to this range. In short lengths a large proportion of the starting material is wasted as scrap at the ends. For practical purposes the length of the cylindrical flexible sheet should be at least twice its diameter. In long lengths mechanical limitations such as the stiffness and straightness of the clamp becomes significant.

A variation of the invention is to make heat-shrinkable tubing which is uniformly tapered in diameter from one end to the other.

The heat source for heating the tubing to be expanded is supplied through a hot gas, such as air, steam, carbon tetrachloride and the like, circulated inside the tube at the operating conditions and preferably should be condensable within the operating conditions to provide rapid heating and cooling, as well as to provide uniform heating. Steam is preferred.

The gas is ordinarily used as both a heat source and a pressure source. Superheating of the steam is optional. The use of steam introduces some special requirements. For example, some of the steam may condense, and this can cause non-uniform cooling after the expansion step. Means may be provided for removing condensate continuously or frequently. This can be done by having the whole apparatus stand on end with the steam inlet at the top end of the tube and the outlet at the bottom so the condensate is moved to the outlet by gravity. Or the apparatus can be tilted slightly from the horizontal so that condensate will flow to the low end, where it can be removed via a dip tube leading to the outlet valve.

If steam is the source of heat and pressure, it must be replaced by another gas during the cooling cycle. This can be done by admitting air (or another cooling gas inert to the heat-shrinkable tubing at operating temperature) at about the same, or higher pressure than the steam; then closing a valve to discontinue steam supply; then opening a vent valve slightly to allow a flow of air through the expanded tubing while maintaining pressure within the tube; and continuing the flow of air until the tubing has cooled enough to hold its expanded shape without internal pressure; then removing the heat-shrinkable tubing from the apparatus for drying and trimming.

The process and apparatus of this invention are applicable to a variety of linear or lightly cross-linked polymeric tubing, including polyolefins, cross-linked polyolefins, ionomer resin, polyfluorinated polymers, such as tetrafluoroethylene polymer, polyamides, polyesters, polyacrylics, ABS polymers and the like.

The tetrafluoroethylene polymer is either the homopolymer thereof, i.e., polytetrafluoroethylene, or a copolymer thereof with sufficient other copolymerizable ethylenically unsaturated monomers to render the resultant copolymer melt fabricable, but usually no greater than 35 weight percent based on the weight of the copolymer. The homopolymer can be modified to include a small proportion of other monomer units short of rendering the polymer melt fabricable, e.g., up to 2 percent by weight of units derived from perfluoroalkyl ethylene or oxyperfluoroalkyltrifluoroethylene of 3 to 10 carbon atoms, or, preferably hexafluoropropylene as described in U.S. Pat. No. 3,142,665 to Cardinal, Edens and Van Dyk. Examples of copolymers in which sufficient comonomer is present to produce a melt fabricable copolymer include tetrafluoroethylene/hexafluoropropylene copolymers such as disclosed in U.S. Pat. No. 2,946.763 to Bro and Sandt, the copolymers of tetrafluoroethylene with higher perfluoroalkenes such as those containing from 4 to 10 carbon atoms, copolymers of tetrafluoroethylene with perfluoroalkyl vinyl ethers (such as perfluoro(propyl or ethyl) vinyl ethers disclosed in U.S. Pat. No. 3,132,123 to Harris and McCane), and the copolymer of tetrafluoroethylene with perfluoro-(2-methylene-4-methyl-1,3-dioxolane) disclosed in U.S. Pat. No. 3,308,107 to Selman and Squire, and the copolymers of tetrafluoroethylene with highly fluorinated monomers, i.e., in which a single hydrogen substituent remains which does not change the fluorocarbon character of the polymer, such monomers being 2-hydroperfluoroalkene containing 3 to 10 carbon atoms, e.g., 2-hydropentafluoropropene, the omega-hydroperfluoroalkenes from 3 to 10 carbon atoms, and the omega-hydrofluoroalkyl perfluorovinyl ethers in which the alkyl group contains from 1 to 5 carbon atoms. The tetrafluoroethylene polymer component can also be a mixture of tetrafluoroethylene polymers, such as polytetrafluoroethylene with melt fabricable copolymers such as tetrafluoroethylene/hexafluoropropylene. The mixture can be made by blending dispersions of the polymers.

Changes in the length of the tubing occur at various points in the expansion cycle. As the unexpanded tube is heated, it increases slightly in length. When it is expanded radially, it becomes shorter in length. When it is cooled to room temperature, the effect is to shorten the tube. Depending on the characteristics desired in the heat-shrinkable tubing, mechanical devices can be used so the expanded tubing is the same length as the unexpanded tubing or shorter or longer. These devices include stops to prevent the end clamps from drawing closer together during the process, tensioning devices to pull the end clamps apart during the process, and the like.

The heat-shrinkable tubing made may have a discernible seam at the point where the two ends of the flexible sheet enter the clamp. The seam can be minimized by placing one or more 0.005 inch layers of Kapton polyimide film between the seam (i.e., the flexible sheet where it entered the clamp) and the tubing to be expanded, or a spacer may be used to fill the groove at the seam as described hereinbelow or as described and claimed in assignee's copending application, Ser. No. 451,118, filed Mar. 14, 1974 which was indicated to be allowable on Jan. 16, 1975.

The temperature to which the plastic tubing is heated will depend on the type of tubing employed. Generally, the temperature will be above 35°C., but will not be above 10°C. below the softening point of the plastic. For polytetrafluoroethylene plastics the temperatures will often range between about 100°C. and 145°C.

The pressure to which the interior of the plastic tubing is subjected will generally range from about 1 to 50 psig., while the time at which the plastic tubing is subjected to the aforesaid temperatures and pressures will range between about 15 and 600 seconds, but neither pressure nor time is critical, so long as the pressure is not so great as to rend the tubing or the restraint.

The following examples are illustrative of the invention, and the invention is not meant to be limited thereby.

EXAMPLE 1

Tetrafluoroethylene/hexafluoropropylene copolymer having a melt viscosity of about 40 × $10^4$ poises at 372°C., available under the Du Pont trade mark Teflon T-160 FEP fluorocarbon resin, was extruded by a conventional method to form an expandable tubing 2.37 inches in diameter with a wall thickness of about 0.025 inches. A piece of this plastic tubing 35¼ inches long was fitted with end plugs. The end plugs were made as follows: Neoprene rubber washers, 2 5/6 inches in outside diameter, were cut from sheet stock and stacked to form a plug about 2½ inches long. These were fitted tightly over a piece of stainless steel pipe tubing threaded at both ends. Steel washers and nuts were then screwed into place at the ends of the rubber plug. The plug was placed in the end of the FEP tubing and a brass shell just larger than the tubing was positioned outside the tubing opposite the plug. The nut at the outer end of the plug was then tightened so as to compress the rubber plug longitudinally and expand it radially. This forced the rubber plug against the tubing, and the tubing against the outer brass shell. It formed a tight seal, with the stainless steel pipe serving as a means to admit or vent gases.

The end plugs were mounted on the fixtures of the expansion apparatus, which was constructed from a metal-working lathe. The motor and turning mechanism were removed from the head stock, which was modified to serve as a fixture to hold the inlet end plug in position. The tail stock of the lathe was similarly modified to hold the exit end plug. The tail stock was arranged so that it could slide freely along the lathe bed. End tension could be supplied by means of a pulley and a weight, or the tail stock could be clamped in place by tightening a nut. In this example, a 20 pound weight was used to provide end tension, but the tail stock was not clamped. The expansion apparatus was piped to provide steam pressure or air pressure through the inlet plug and to allow venting or closing the vent at the exit plug.

A loop of polyimide film (the flexible sheet) was made around the plastic tubing in the expansion apparatus. This film was 0.005 inch thick and was a commercial product sold under the Du Pont trade mark, Kapton 500 gage polyimide film. The ends of the film loop were clamped together between two aluminum bars with a 1 inch by 2 inch rectangular cross-section and a length of 31 inches to form a cylinder around the FEP tubing. One bar was supported by the expansion apparatus and adjusted in such a way that the axis of the resulting film loop was approximately coincident with the axis of the FEP plastic tubing. The second bar was clamped against the first bar by means of C-clamps to hold the film rigidly in place. The size of the loop was adjusted to give a final restraining cylinder diameter of 3.1 inches.

With the exit valve open, steam at 34 psig (about 138°C.) supply pressure was admitted through the inlet. It required about 5 seconds to completely open the steam valve. Steam was then allowed to flow through the tube for 18 seconds. The exit valve was then closed. During a period of 20 seconds, the tubing was further heated by the steam and expanded so that it pressed against the flexible restraining tube. A valve was then opened to admit air at 30 psig. The steam valve was simultaneously closed. The exit valve was then opened slightly to permit gas to escape, but to maintain the pressure inside the FEP plastic tubing. Compressed air was allowed to bleed through the expanded tubing until the tubing had cooled sufficiently so that the pressure could be removed without the tubing shrinking.

The result was a piece of plastic tubing with a cylindrically expanded section, two end sections of the original, unexpanded diameter, and two transition sections between the end diameter and the expanded diameter. Cutting off the end and transition sections gave a length of heat shrinkable plastic tubing which had the desired property of shrinking back to its original diameter when heated above 150°C. The heat shrinkable plastic tubing was smooth with a circular cross-section except that there was a visible line where the ends of the restraining loop had been clamped together. This line or seam was raised enough that it could be felt by passing a finger over it.

EXAMPLE 2

The process of Example 1 was substantially repeated except the unexpanded plastic tubing was 1½ inches in diameter, the expanded tubing 2 inches in diameter, and the restraining flexible sheet cylinder was made of 10 mil Du Pon Armalon TFE-fluorocarbon resin coated glass fabric. The unexpanded tube had the following thickness at various points: 24, 26, 25, 23 mils. The expanded tubing had the following thickness at various points: 18, 17, 16, 15, 16, 17, 14, 16, 16 mils.

EXAMPLE 3

Tubing expansion was carried out using the expansion apparatus described in Example 1, but with the variations listed below. The starting plastic tubing had a diameter of 10.6 inches and a wall thickness of 0.025 inch. The circumference of the film restraining loop was set at 40 inches. The end tension was 5 pounds. The end plugs were thick aluminum discs with a recessed groove ⅞ inch wide and 3/16 inch deep around the outer surface. A piece of neoprene rubber ⅛ inch thick was cut to fit this groove and cemented into place. This plug was placed in the end of the plastic tubing and a clamping band tightened around the outside of the tubing, opposite the rubber-filled groove. This formed a tight seal.

A device to minimize the seam was employed. The seam device was formed from two aluminum clamping bars with a 1 × 2 inch rectangular cross-section and a length of 31 inches. The lower inner edges were rounded to about a ⅛ inch radius. A piece of brass sheet stock 3/64 inch thick was cut to fit between the clamping bars. This sheet was used to support a small wedge-shaped spacer which held the ends of the film loop slightly separated against the rounded edges with an aluminum-filled cement which hardened to form the desired wedge.

With the plastic tubing and end plugs positioned in the flexible restraining cylinder in the expansion apparatus, and the exit valve open, steam at 12 psig supply pressure was admitted. Steam was allowed to pass through the tubing for 2 minutes. Then the exit valve was closed while the steam supply was maintained for about 1–2 minutes. The plastic tubing expanded against the restraining loop of the flexible sheet. The steam valve was closed and simultaneously compressed air at 13 psig was admitted. The exit valve was opened slightly and the tubing cooled with compressed air for 3 minutes. The result, after removing the end portions, was a length of cylindrical heat-shrinkable plastic tubing. The seam mark had been considerably reduced as compared with Example 1. It was still visible, however, and could be detected tactually by passing a fingernail across the surface of the tube.

EXAMPLE 4

Tubing expansion was carried out in the same manner as Example 3 except that 15 pounds end tension was used and a strip of polyimide film 0.005 inch thick and about 3 inches wide was placed between the seam-closure device and the plastic tubing. The steam pressure was 14 psig and the air pressure was 16 psig. The resulting heat-shrinkable tubing showed faintly visible marks at the edges of the film strip and the seam line. These were not, however, tactually perceptible. It was observed, however, that a portion of the expanded tubing, where an elongated pool of condensate had formed during the heat expansion step, was thicker than the rest of the expanded tubing. This thicker strip, about 1½ inches wide, extended the length of the uniform portion of the expanded tube.

EXAMPLE 5

Tubing expansion was carried out in the same manner as in Example 4 except for the following variations: The circumference of the restraining cylinder was 38¾ inches. One end of the expansion apparatus was raised so that the cylinder and the plastic tubing had a slope of about 1 inch vertical to 5 inches horizontal. The tail-stock was clamped in position rather than being free to move under the influence of an applied end tension. Condensate collected in the portion of the plastic tube where the diameter was changing from the expanded size to the original size. This prevented a thick section from developing in the useful, straight portion of heat shrinkable tubing.

EXAMPLE 6

Expansion was carried out as in Example 5 with the following variations. A dip tube with a flexible tip was provided so that steam condensate could be blown out of the tube during the expansion cycle. A weight of 7.85 pounds was used to provide end tension and the tail-stock was not clamped. The steam pressure was 12 psig. The air pressure was 15 psig. It was observed that the 32 inch long plastic tubing increased in length ¼ inch during the steam heating cycle. During the radial expansion of the tubing, the length decreased 1 inch. The length decreased an additional ¼ inch during the cooling cycle. No difficulty was experienced in blowing out condensate by opening, momentarily, the valve on the tube dipping into the steam condensate.

EXAMPLE 7

The process of Example 1 was repeated except that the plastic tubing before expansion was 1 inch diameter and the heat-shrinkable tubing after expansion was 1½ inch in diameter. After trimming off the end portions with diameter less than 1½ inch, the heat-shrinkable tube was slipped over a cylinder 1¼ inch in diameter, to provide a roll covering test. The heat-shrinkable tubing was heated with a hot air gun, starting at one end of the tubing and progressing to the other end as shrinkage occured. The plastic tubing shrank uniformly and fit tightly on the cylinder, showing that the heat-shrinkable tubing was of good quality.

In addition to the polyimide and coated glass fabric flexible sheets employed as the cylindrical restraint in the foregoing examples, the flexible sheet may be a glass cloth coated with polytetrafluoroethylene such as Pallflex EmFAB, TV20A60; a silicone rubber-coated glass fabric; or a nonwoven paper composed of fibrids of an aromatic polyamide, such as Nomex nylon paper.

As seen from the examples, the process of this invention is not operated continuously.

The preceding representative examples may be varied within the scope of the disclosure herein, as understood and practiced by one skilled in the art, to achieve substantially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. An apparatus for preparing heat-shrinkable plastic tubing by radially expanding lengths of plastic tubing to a larger diameter within a cylinder which comprises
   a. a heat-resistant flexible sheet looped into cylindrical shape to form a restraint, the loop being formed by looping one end of said sheet back upon the opposite end so that a portion of the surface along one of the ends abuts a portion of the same surface of the sheet along the other end;
   b. a pair of clamps extending longitudinally along the portions of the cylindrically shaped sheet which abut to form the cylinder, positioned such that the ends of the sheet which abut are between the clamps so that at least one looped end of the sheet can be moved between the clamps to a distance from said clamps on the side of the clamps opposite the cylindrical shape, and c. means located at each end of the cylindrically shaped sheet to provide (1) a pressure-tight fitting between the inside and outside of said plastic tubing, and (2) a gas conduit through the fitting.

2. The apparatus of claim 1 wherein the flexible sheet is a polyimide sheet.

3. The apparatus of claim 1 wherein the flexible sheet is a glass fabric coated with a heat-resistant elastomer.

* * * * *